(12) United States Patent
Kojima et al.

(10) Patent No.: US 8,735,015 B2
(45) Date of Patent: May 27, 2014

(54) FUEL CELL

(75) Inventors: Hidetada Kojima, Utsunomiya (JP); Masaru Oda, Utsunomiya (JP); Keisuke Suda, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 189 days.

(21) Appl. No.: 12/873,904

(22) Filed: Sep. 1, 2010

(65) Prior Publication Data

US 2011/0053031 A1 Mar. 3, 2011

(30) Foreign Application Priority Data

Sep. 1, 2009 (JP) ................................. 2009-201860

(51) Int. Cl.
*H01M 8/24* (2006.01)

(52) U.S. Cl.
USPC .......................................... 429/455; 429/457

(58) Field of Classification Search
USPC .................................. 429/455–457
See application file for complete search history.

(56) References Cited

U.S. PATENT DOCUMENTS

| | | | |
|---|---|---|---|
| 8,110,316 B2 * | 2/2012 | Oda et al. ....................... | 429/483 |
| 2007/0207372 A1 | 9/2007 | Kikuchi et al. | |

FOREIGN PATENT DOCUMENTS

| | | | | |
|---|---|---|---|---|
| EP | 1557894 A1 | 7/2005 | | |
| EP | 1995809 A1 | 11/2008 | | |
| JP | 2003-317793 | 11/2003 | | |
| JP | 2003317793 A | * 11/2003 | ............. | H01M 8/24 |
| JP | 2006-147467 | 6/2006 | | |
| JP | 2006147467 A | * 6/2006 | ............. | H01M 8/02 |
| JP | 2008-21515 | 1/2008 | | |
| JP | 2009-4230 | 1/2009 | | |
| KR | 1020080099946 | 11/2008 | | |
| WO | 2005/055348 A2 | 6/2005 | | |
| WO | 2006/054399 A1 | 5/2006 | | |
| WO | 2006/062768 A2 | 6/2006 | | |

OTHER PUBLICATIONS

Japanese Office Action for Application No. 2009-201860, dated Aug. 23, 2011.
European Search Report for Application No. 10172146.2, dated Oct. 5, 2010.

* cited by examiner

*Primary Examiner* — Karie O'Neill Apicella
(74) *Attorney, Agent, or Firm* — Nelson Mullins Riley & Scarborough LLP; Anthony A. Laurentano

(57) ABSTRACT

A fuel cell includes a plurality of power generation cells each having a first separator. The separator has a fuel gas flow field. A fuel gas supply passage extends through one corner of the power generation cell in the stacking direction, a fuel gas flowing through the fuel gas supply passage into a fuel gas flow field. An inlet buffer is provided upstream of the fuel gas flow field. The fuel gas supply passage and the inlet buffer are connected by a plurality of inlet connection grooves. The inlet connection grooves are inclined from a direction perpendicular to a wall surface of the fuel gas supply passage toward the center of the fuel gas flow field.

5 Claims, 7 Drawing Sheets

FUEL CELL

CROSS-REFERENCE TO RELATED APPLICATION

This application is based upon and claims the benefit of priority from Japanese Patent Application No. 2009-201860 filed on Sep. 1, 2009, of which the contents are incorporated herein by reference.

BACKGROUND OF THE INVENTION

1. Field of the Invention

The present invention relates to a fuel cell including a plurality of power generation cells each formed by stacking an electrolyte electrode assembly and a separator together in a stacking direction. The electrolyte electrode assembly includes a pair of electrodes and an electrolyte interposed between the electrodes. A reactant gas flow field for supplying a fuel gas or an oxygen-containing gas as a reactant gas along one electrode is formed on one surface of the separator facing the one electrode, and a reactant gas supply passage extends through at least one corner of the power generation cell in the stacking direction for allowing the reactant gas to flow through the reactant gas passage and flow into the reactant gas flow field.

2. Description of the Related Art

For example, a solid polymer electrolyte fuel cell employs a membrane electrode assembly (MEA) which includes an anode, a cathode, and an electrolyte membrane interposed between the anode and the cathode. The electrolyte membrane is a polymer ion exchange membrane. The membrane electrode assembly and a pair of separators sandwiching the membrane electrode assembly make up a power generation cell. In use, generally, a predetermined number of power generation cells of this type are stacked together to form a fuel cell stack mounted in a vehicle.

In the fuel cell, a fuel gas flow field (reactant gas flow field) is formed in a surface of one separator facing the anode for supplying a fuel gas (reactant gas) to the anode, and an oxygen-containing gas flow field (reactant gas flow field) is formed in a surface of the other separator facing the cathode for supplying an oxygen-containing gas (reactant gas) to the cathode. Further, a coolant flow field is formed between adjacent separators for supplying a coolant along surfaces of the separators.

Further, in many cases, the fuel cell of this type adopts a so-called internal manifold structure where in the interior of the fuel cell, there are provided a fuel gas supply passage (reactant gas supply passage) and a fuel gas discharge passage (reactant gas discharge passage) through which the fuel gas flows, an oxygen-containing gas supply passage (reactant gas supply passage) and an oxygen-containing gas discharge passage (reactant gas discharge passage) through which the oxygen-containing gas flows, and a coolant supply passage and a coolant discharge passage through which the coolant flows, each of which extends through the fuel cell in the stacking direction of the power generation cells.

For example, as a fuel gas having the internal manifold structure, a fuel cell having a separator structure disclosed in Japanese Laid-Open Patent Publication No. 2008-021515 is known. As shown in FIG. 7, the separator structure comprises a metal plate 1, and an oxygen-containing gas manifold 2, a coolant manifold 3 and a fuel gas manifold 4 extend through an end portion of the metal plate 1.

A fuel gas flow field 5 is formed in a surface of the metal plate 1, and a fuel gas distribution area 6 and a fuel gas inlet 7 are provided between the fuel gas flow field 5 and the fuel gas manifold 4. A plurality of bosses 6a are provided in the fuel gas distribution area 6. The fuel gas inlet 7 has a plurality of inlet grooves 7a adjacent to the fuel gas manifold 4.

In the structure, the fuel gas supplied through the fuel gas manifold 4 to the metal plate 1 flows into the fuel gas distribution area 6 through the inlet grooves 7a, and thereafter the fuel gas is supplied to the fuel gas flow field 5.

However, in Japanese Laid-Open Patent Publication No. 2008-021515, the fuel gas manifold 4 is provided at the one corner of the metal plate 1. The fuel gas introduced into the fuel gas inlet 7 through the fuel gas manifold 4 is difficult to supply uniformly over the entire fuel gas flow field 5.

In particular, the fuel gas is not supplied sufficiently to an area 8 which is remote from the fuel gas inlet 7. In this area 8, power generation cannot be performed suitably.

SUMMARY OF THE INVENTION

The present invention has been made to solve the problem of this type, and an object of the present invention is to provide a fuel cell which is capable of supplying a reactant gas uniformly and suitably to the entire area of a reactant gas flow field and performing a desired power generation reliably, with a simple structure.

The present invention relates to a fuel cell including a plurality of power generation cells. Each of the power generation cells is formed by stacking an electrolyte electrode assembly and a separator together in a stacking direction. The electrolyte electrode assembly includes a pair of electrodes and an electrolyte interposed between the electrodes. A reactant gas flow field for supplying a fuel gas or an oxygen-containing gas as a reactant gas along one of the electrodes is formed on one surface of the separator facing the one electrode. A reactant gas supply passage extends through at least one corner of the power generation cell in the stacking direction, the reactant gas flowing through the reactant gas supply passage into the reactant gas flow field.

An inlet buffer is provided upstream of the reactant gas flow field, and the reactant gas supply passage and the inlet buffer are connected by a plurality of inlet connection grooves. In a surface of the separator, the inlet connection grooves are inclined relative to a wall surface of the reactant gas supply passage that is adjacent to the inlet buffer, from a direction perpendicular to the wall surface toward the center of the reactant gas flow field.

In the present invention, the inlet connection grooves are inclined relative to the wall surface of the reactant gas supply passage, from the direction perpendicular to the wall surface toward the center of the reactant gas flow field. Thus, in comparison with the structure where the inlet connection grooves are provided along the direction perpendicular to the wall surface, the length of the inlet connection grooves is increased.

Therefore, since the pressure loss in the reactant gas flowing through the inlet connection grooves is large, the reactant gas is distributed over the entire area of the inlet buffer. In the structure, the reactant gas can be supplied to the entire area of the reactant gas flow field uniformly and suitably, and a desired power generation can be performed. Further, the performance of distributing the reactant gas in the separator surface is improved, and the area of the inlet buffer can be reduced easily.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
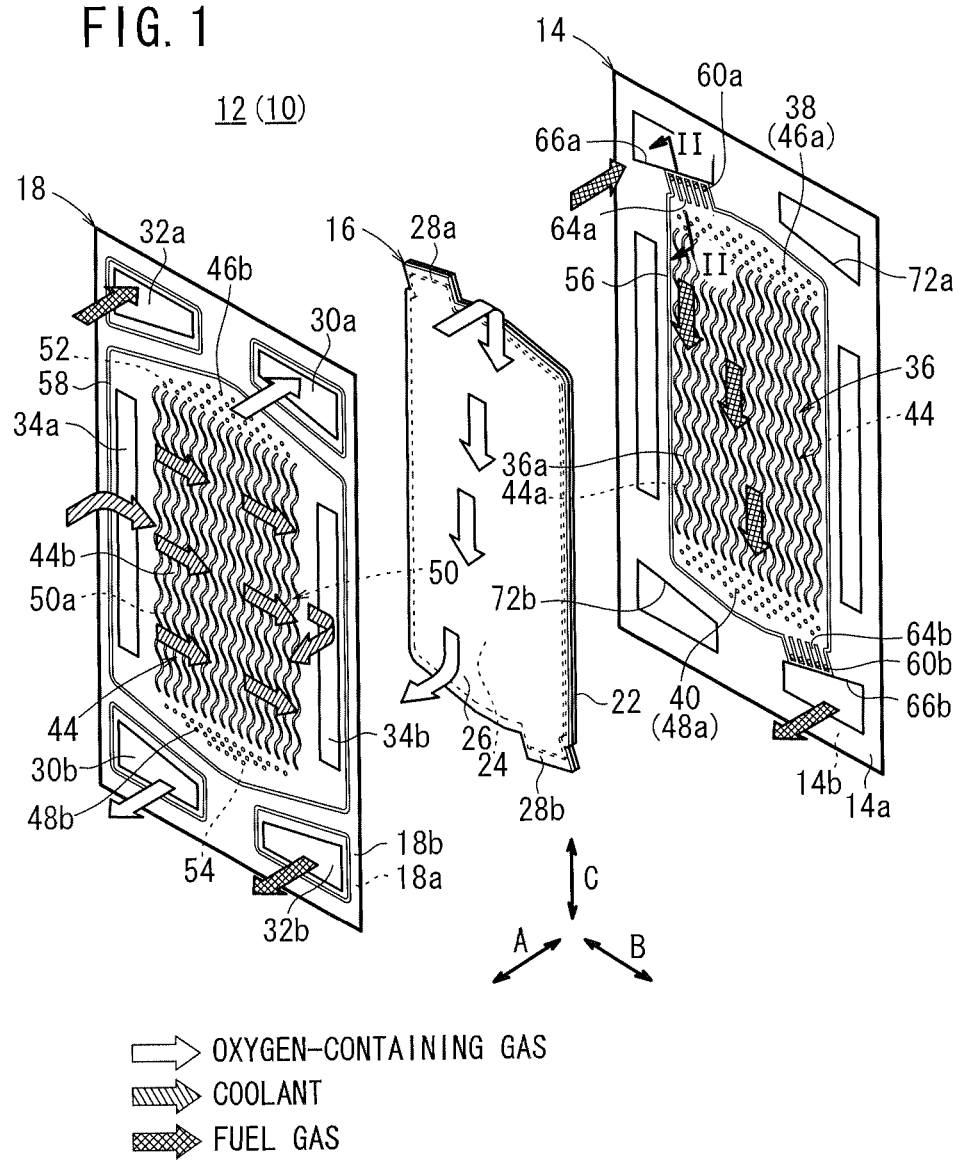
FIG. 1 is an exploded perspective view schematically showing main components of a fuel cell according to a first embodiment of the present invention.
Figure 2:
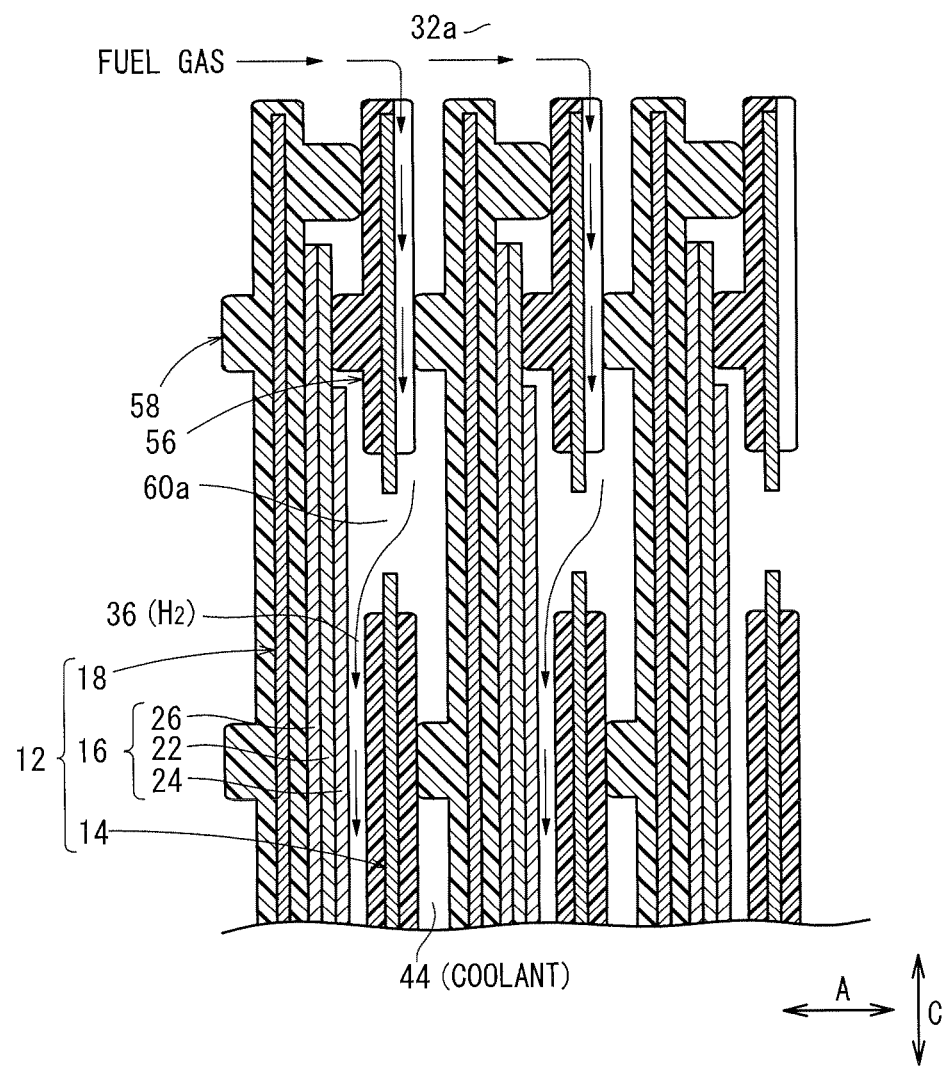
FIG. 2 is a cross sectional view showing the fuel cell, taken along a line II-II in FIG. 1.

As shown in FIGS. 1 and 2, a fuel cell 10 according to a first embodiment of the present invention is formed by stacking a plurality of power generation cells 12 in a horizontal direction indicated by an arrow A or in a vertical direction indicated by an arrow C.

Each of the power generation cells 12 includes a first separator 14, a membrane electrode assembly (electrolyte electrode assembly) 16, and a second separator 18. For example, the first separator 14 and the second separator 18 are elongated metal plates such as steel plates, stainless steel plates, aluminum plates, plated steel sheets, or metal plates having anti-corrosive surfaces formed by surface treatment.

Each of the first separator 14 and the second separator 18 has a rectangular shape in a plan view, and has a corrugated shape in cross section by corrugating a metal thin plate by press work. Instead of using the metal separators, carbon separators may be used as the first separator 14 and the second separator 18.

The membrane electrode assembly 16 includes an anode (electrode) 24, a cathode (electrode) 26, and a solid polymer electrolyte membrane (electrolyte) 22 interposed between the anode 24 and the cathode 26. The solid polymer electrolyte membrane 22 is formed by impregnating a thin membrane of perfluorosulfonic acid with water, for example. In the membrane electrode assembly 16, the surface area of the anode 24 is smaller than the surface areas of the solid polymer electrolyte membrane 22 and the cathode 26. That is, the membrane electrode assembly 16 is constructed as a so-called stepped-type MEA (see FIGS. 1 and 2).

Each of the anode 24 and the cathode 26 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 24 and the electrode catalyst layer of the cathode 26 are fixed to both surfaces of the solid polymer electrolyte membrane 22, respectively.

As shown in FIG. 1, an upper extension 28a protruding toward a fuel gas supply passage 32a as described later is provided on one short side (upper side) of the membrane electrode assembly 16. A lower extension 28b protruding toward the fuel gas discharge passage 32b as described later is provided on the other short side (lower side) of the membrane electrode assembly 16.

At both corners of an upper end of the power generation cell 12 in a longitudinal direction indicated by the arrow C, an oxygen-containing gas supply passage (reactant gas supply passage) 30a for supplying an oxygen-containing gas, and a fuel gas supply passage (reactant gas supply passage) 32a for supplying a fuel gas such as a hydrogen-containing gas are provided. The oxygen-containing gas supply passage 30a and the fuel gas supply passage 32a extend through the power generation cell 12 in the direction indicated by the arrow A.

At both corners of a lower end of the power generation cell 12 in the longitudinal direction indicated by the arrow C, a fuel gas discharge passage (reactant gas discharge passage) 32b for discharging the fuel gas and the oxygen-containing gas discharge passage (reactant gas discharge passage) 30b for discharging the oxygen-containing gas are provided. The fuel gas discharge passage 32b and the oxygen-containing gas discharge passage 30b extend through the power generation cell 12 in the direction indicated by the arrow A.

At one end of the power generation cell 12 in a lateral direction indicated by an arrow B, a coolant supply passage 34a for supplying coolant is provided, and at the other end of the power generation cell 12 in the lateral direction indicated by the arrow B, a coolant discharge passage 34b for discharging the coolant is provided. The coolant supply passage 34a and the coolant discharge passage 34b extend through the power generation cell 12 in the direction indicated by the arrow A.

Figure 3:
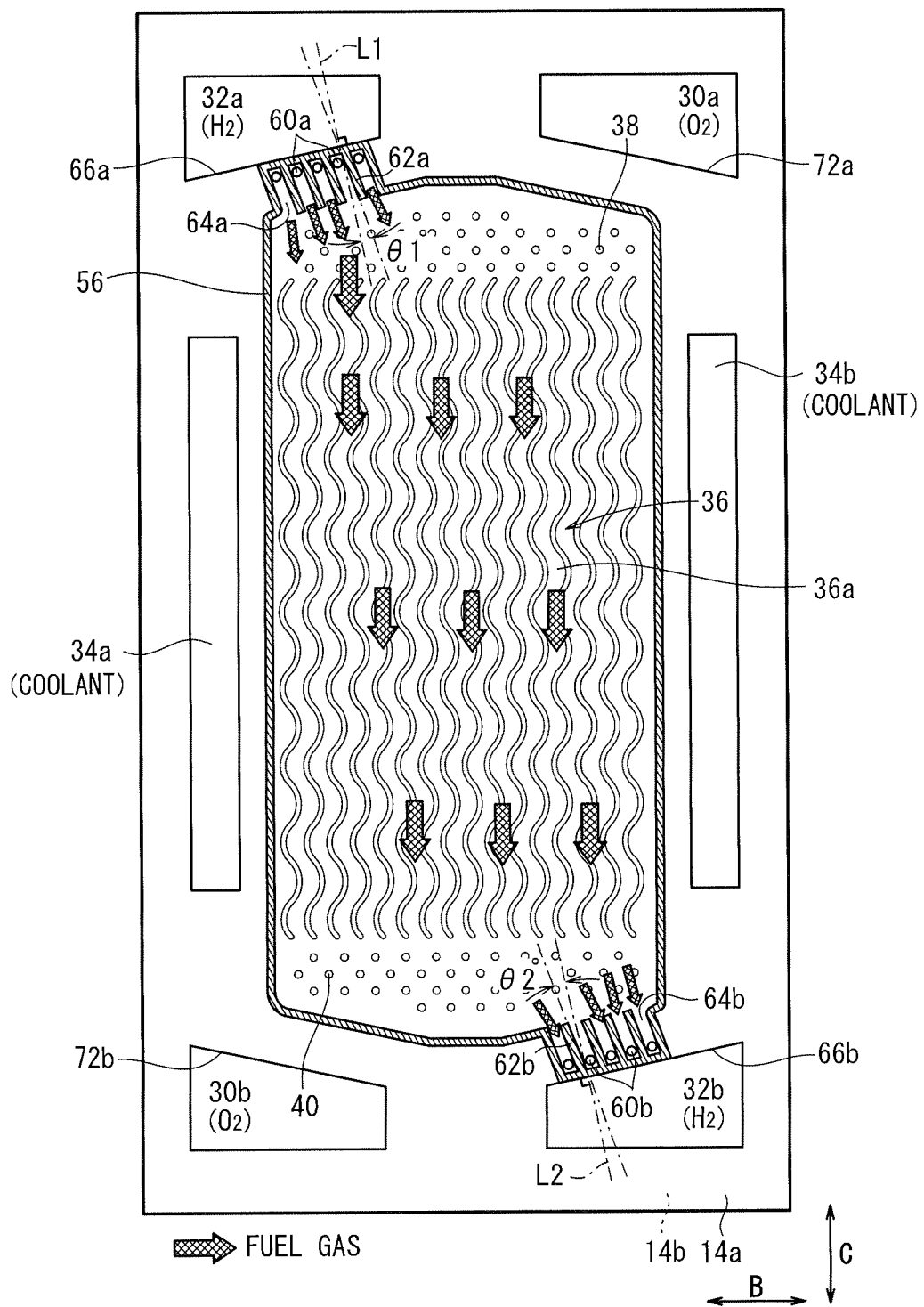
FIG. 3 is a front view showing a first separator of the fuel cell.

As shown in FIG. 3, the first separator 14 has a fuel gas flow field (reactant gas flow field) 36 on its surface 14a facing the membrane electrode assembly 16. The fuel gas flow field 36 connects the fuel gas supply passage 32a and the fuel gas discharge passage 32b. The fuel gas flow field 36 includes a plurality of corrugated flow grooves extending in the direction indicated by the arrow C. An inlet buffer 38 and an outlet buffer 40 each having bosses are provided adjacent to the inlet and the outlet of the fuel gas flow field 36 respectively.

A plurality of flow grooves 44a connecting the coolant supply passage 34a and the coolant discharge passage 34b are formed on a surface 14b of the first separator 14, as part of the coolant flow field 44 (see FIG. 1). An inlet buffer 46a and an outlet buffer 48a each having bosses are provided adjacent to the inlet and the outlet of the flow grooves 44a.

Figure 4:
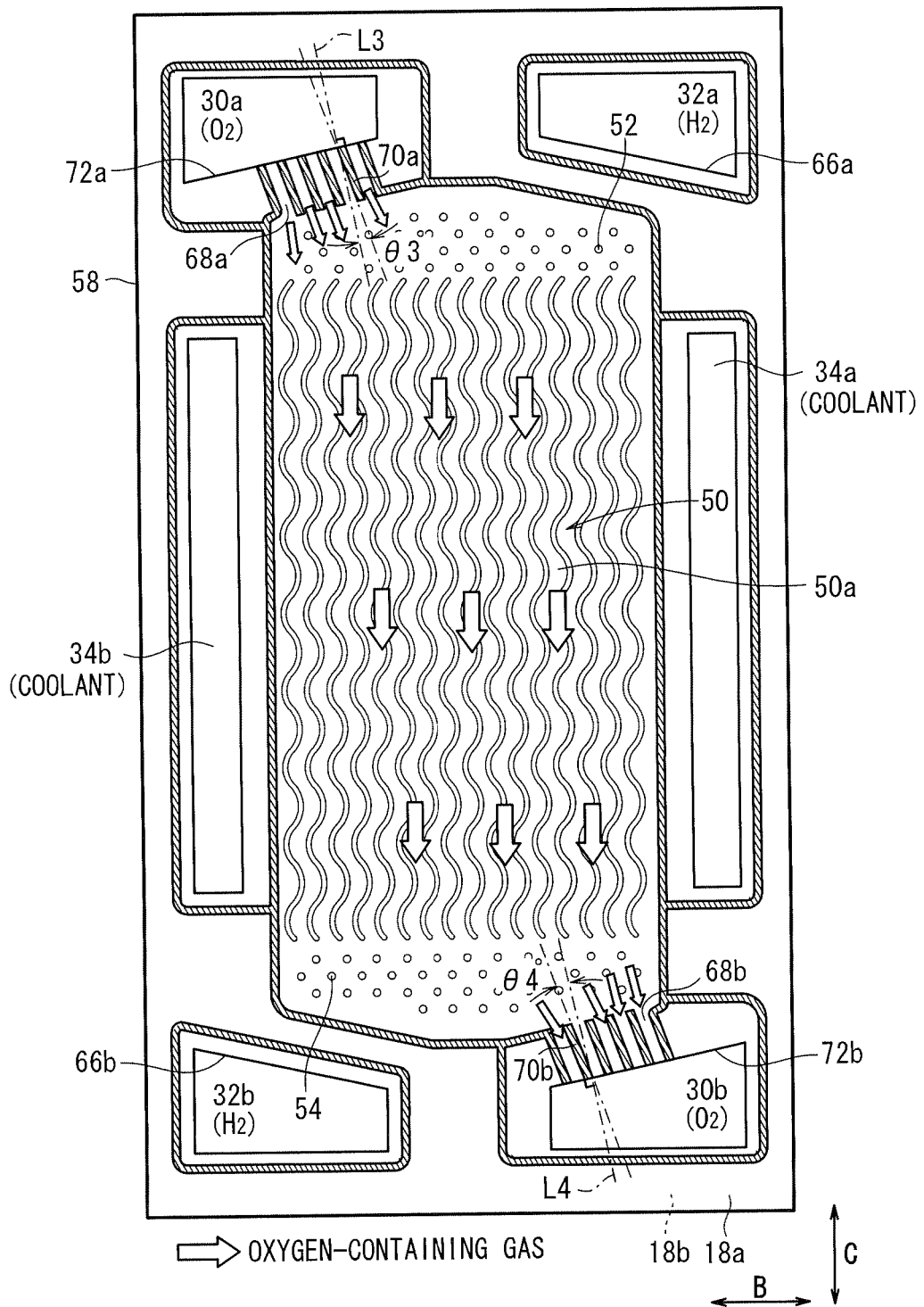
FIG. 4 is a front view showing a second separator of the fuel cell.

As shown in FIG. 4, the second separator 18 has an oxygen-containing gas flow field (reactant gas flow field) 50 on its surface 18a facing the membrane electrode assembly 16. The oxygen-containing gas flow field 50 connects the oxygen-containing gas supply passage 30a and the oxygen-containing gas discharge passage 30b. The oxygen-containing gas flow field 50 includes a plurality of corrugated flow grooves 50a extending in the direction indicated by the arrow C. An inlet buffer 52 and an outlet buffer 54 each having bosses are provided adjacent to the inlet and the outlet of the oxygen-containing gas flow field 50 respectively.

As shown in FIG. 1, a plurality of flow grooves 44b are formed on a surface 18b of the second separator 18, as part of the coolant flow field 44. An inlet buffer 46b and an outlet buffer 48b each having bosses are provided adjacent to the inlet and the outlet of the flow grooves 44b.

As shown in FIGS. 1 and 2, a first seal member 56 is formed integrally with the surfaces 14a, 14b of the first separator 14, around the outer peripheral end of the first separator 14. Alternatively, a member separate from the first separator 14 may be provided as the first seal member 56 provided on the surfaces 14a, 14b of the first separator 14. A second seal member 58 is formed integrally with the surfaces 18a, 18b of the second separator 18, around the outer peripheral end of the second separator 18. Alternatively, as a member separate from the second separator 18 may be provided as the second seal member 58 on the surfaces 18a, 18b of the second separator 18.

As shown in FIG. 3, the first separator 14 has a plurality of supply holes 60a connecting the fuel gas supply passage 32a and the fuel gas flow field 36, and a plurality of discharge holes 60b connecting the fuel gas discharge passage 32b and the fuel gas flow field 36.

The supply holes 60a are connected to the inlet buffer 38 through a plurality of inlet connection grooves 64a formed between a plurality of receivers 62a. In the separator surface, the inlet connection grooves 64a are inclined relative to a wall surface 66a of the fuel gas supply passage 32a that is adjacent to the inlet buffer 38, at an angle θ1° from a direction perpendicular to the wall surface 66a (perpendicular line L1) toward the center of the fuel gas flow field 36.

The wall surface 66a is inclined upwardly from the horizontal direction indicated by the arrow B toward the center of the first separator 14. However, the present invention is not limited in this respect. For example, the wall surface 66a may extend in the horizontal direction. Wall surfaces as described later also may extend in the horizontal direction. On the outlet side, the wall surface is inclined downwardly (see a wall surface 66b).

The discharge holes 60b are connected to the outlet buffer 40 through a plurality of outlet connection grooves 64b formed between a plurality of receivers 62b. In the separator surface, the outlet connection grooves 64b are inclined from a wall surface 66b of the fuel gas discharge passage 32b that is adjacent to the outlet buffer 40, at an angle θ2° from a direction perpendicular to the wall surface 66b (perpendicular line L2) toward the center of the fuel gas flow field 36.

In the illustrated embodiment, though the angle θ1° and the angle θ2° are the same, the angle θ1° may be larger than the angle θ2° (θ1°>θ2°).

As shown in FIG. 4, in the second separator 18, a plurality of receivers 70a forming inlet connection grooves 68a are provided at a portion connecting the oxygen-containing gas supply passage 30a and the inlet buffer 52, and a plurality of receivers 70b forming outlet connection grooves 68b are provided at a portion connecting the oxygen-containing gas discharge passage 30b and the outlet buffer 54.

In the separator surface, the inlet connection grooves 68a are inclined from a wall surface 72a of the oxygen-containing gas supply passage 30a that is adjacent to the inlet buffer 52 at an angle θ3° from a direction perpendicular to the wall surface 72a (perpendicular line L3) toward the center of the oxygen-containing gas flow field 50.

In the separator surface, the outlet connection grooves 68b are inclined from a wall surface 72b of the oxygen-containing gas discharge passage 30b that is adjacent to the outlet buffer 54 at an angle θ4° from a direction perpendicular to the wall surface 72b (perpendicular line L4) toward the center of the oxygen-containing gas flow field 50.

In the illustrated embodiment, though the angle θ3° and the angle θ4° are the same, the angle θ3° may be larger than the angle θ4° (θ3°>θ4°).

Operation of the fuel cell 10 will be described below.

Firstly, as shown in FIG. 1, an oxygen-containing gas is supplied to the oxygen-containing gas supply passage 30a, and a fuel gas such as a hydrogen-containing gas is supplied to the fuel gas supply passage 32a. Further, a coolant such as pure water, ethylene glycol, oil, etc. is supplied to the coolant supply passage 34a.

Thus, the oxygen-containing gas flows from the oxygen-containing gas supply passage 30a into the oxygen-containing gas flow field 50 of the second separator 18. The oxygen-containing gas moves along the first oxygen-containing gas flow field 50 in the gravity direction indicated by the arrow C, and the oxygen-containing gas is supplied to the cathode 26 of the membrane electrode assembly 16 (see FIG. 4).

In the meanwhile, as shown in FIG. 2, the fuel gas flows from the fuel gas supply passage 32a toward the surface 14a of the first separator 14 through the supply holes 60a. The fuel gas flows along the fuel gas flow field 36 in the direction of gravity indicated by the arrow C, and the fuel gas is supplied to the anode 24 of the membrane electrode assembly 16 (see FIGS. 1 and 3).

Thus, in the membrane electrode assembly 16, the oxygen-containing gas supplied to the cathode 26, and the fuel gas supplied to the anode 24 are consumed in electrochemical reactions at the electrode catalyst layers of the cathode 26 and the anode 24 for generating electricity.

Then, the oxygen-containing gas consumed at the cathode 26 of the membrane electrode assembly 16 is discharged along the oxygen-containing gas discharge passage 30b in the direction indicated by the arrow A. The fuel gas consumed at the anode 24 of the membrane electrode assembly 16 flows toward the surface 14b of the first separator 14 through the discharge holes 60b, and the fuel gas is discharged into the fuel gas discharge passage 32b.

Further, as shown in FIGS. 1 and 2, the coolant supplied to the coolant supply passage 34a flows into the coolant flow field 44 formed between the first separator 14 of one of the adjacent power generation cells 12 and the second separator 18 of the other of the adjacent power generation cells 12.

In the structure, the coolant is supplied from the coolant supply passage 34a to the coolant flow field 44, and flows in the direction indicated by the arrow B to cool the power generation cells 12. Then, the coolant is discharged into the coolant discharge passage 34b.

In the first embodiment, as shown in FIG. 3, the inlet connection grooves 64a through which the fuel gas flows into the fuel gas flow field 36 are inclined at the angle θ1° from the direction (perpendicular line L1) perpendicular to the wall surface 66a of the fuel gas supply passage 32a toward the center of the fuel gas flow field 36. Therefore, in comparison with the structure where the inlet connection grooves 64a are provided in the direction perpendicular to the wall surface 66a, the length of the inlet connection grooves 64a is increased.

Thus, since the pressure loss in the fuel gas flowing through the inlet connection grooves 64a is large, the fuel gas is distributed over the entire inlet buffer 38. As a result, the fuel gas is supplied uniformly and suitably to the entire area of the fuel gas flow field 36, and a desired power generation can be performed reliably.

Further, in the first separator 14, improvement in the performance of distributing the fuel gas in the separator surface is achieved, and the surface area of the inlet buffer 38 can be reduced easily. Therefore, the area in the separator surface can be utilized effectively, and the power generation efficiency can be improved.

Further, as shown in FIG. 4, the inlet connection grooves 68a through which the oxygen-containing gas flows into the oxygen-containing gas flow field 50 are inclined at the angle θ3° from the direction (perpendicular line L3) perpendicular to the wall surface 72a of the oxygen-containing gas supply passage 30a toward the center of the oxygen-containing gas flow field 50. Therefore, the oxygen-containing gas is supplied uniformly and suitably to the entire area of the oxygen-containing gas flow field 50, and thus a desired power generation can be performed reliably. That is, the same advantages as in the case of the fuel gas flow field 36 are obtained.

As shown in FIG. 3, the outlet connection grooves 64b through which the fuel gas flows out of the fuel gas flow field 36 are inclined at the angle θ2° from the direction (perpendicular line L2) perpendicular to the wall surface 66b of the fuel gas discharge passage 32b toward the center of the fuel gas flow field 36. Likewise, as shown in FIG. 4, the outlet connection grooves 68b through which the oxygen-containing gas flows out of the oxygen-containing gas flow field 50 are inclined at the angle θ4° from the direction (perpendicular line L4) perpendicular to the wall surface 72b of the oxygen-containing gas discharge passage 30b toward the center of the oxygen-containing gas flow field 50.

Therefore, in the outlet connection grooves 64b and the outlet connection grooves 68b, the pressure losses in the fuel gas and the oxygen-containing gas are large. Thus, the water produced in the power generation is blown off into the fuel gas discharge passage 32b and the oxygen-containing gas discharge passage 30b, respectively, and the performance of discharging the water is improved easily.

Figure 5:
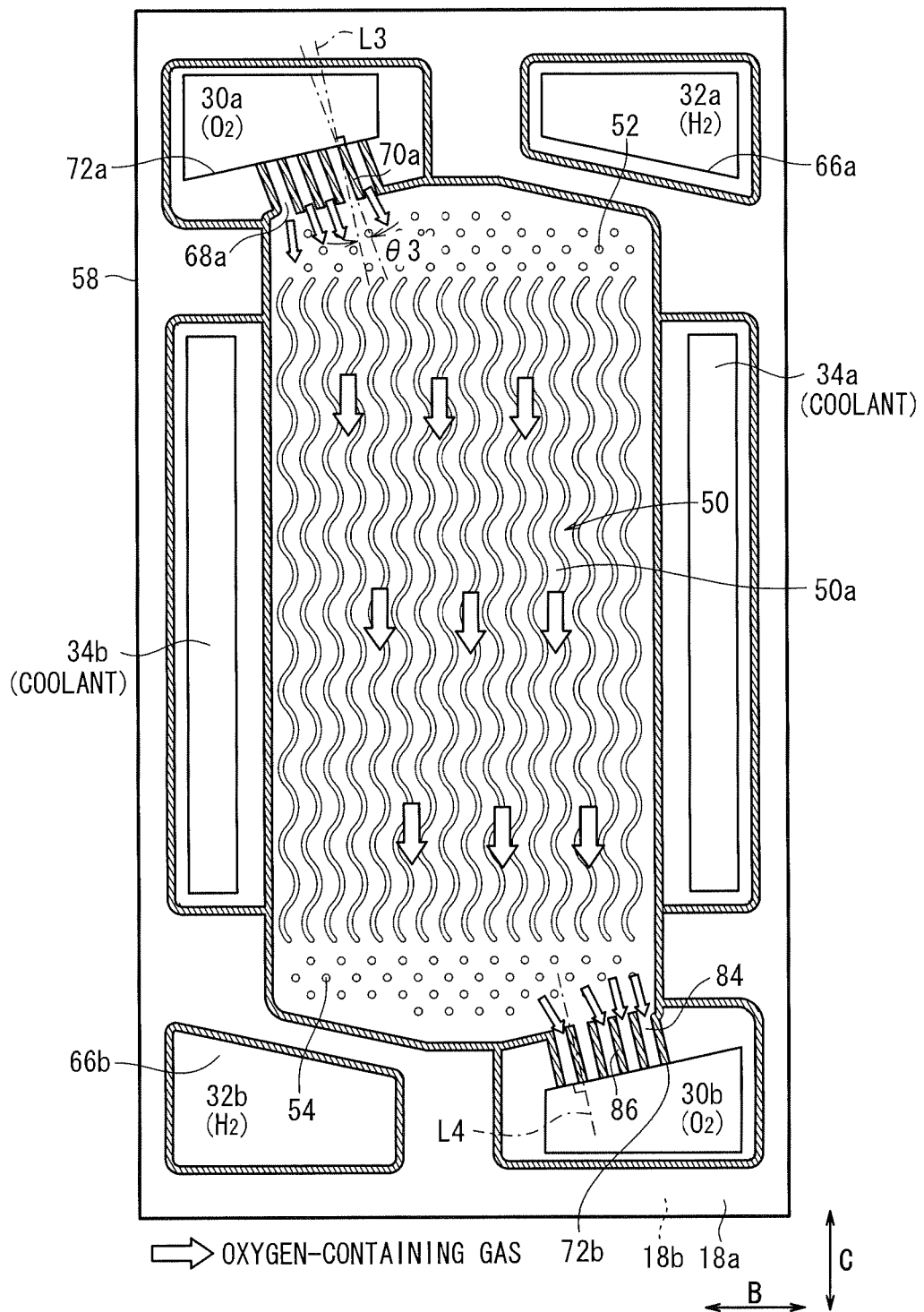
FIG. 5 is a front view showing a second separator of a fuel cell according to a second embodiment of the present invention.

FIG. 5 is a front view showing a second separator 82 of a fuel cell 80 according to a second embodiment of the present invention. The constituent elements that are identical to those of the second separator 18 of the fuel cell 10 according to the first embodiment are labeled with the same reference numerals, and descriptions thereof are omitted. Also, in a third embodiment to be described later, the constituent elements that are identical to those of the second separator 18 of the fuel cell 10 according to the first embodiment are labeled with the same reference numerals, and descriptions thereof are omitted.

The second separator 82 has a plurality of receivers 86 at a portion connecting the oxygen-containing gas discharge passage 30b and the outlet buffer 54. The receivers 86 form a plurality of outlet connection grooves 84. The outlet connection grooves 84 are provided in parallel with a direction (perpendicular line L4) perpendicular to a wall surface 72b of the oxygen-containing gas discharge passage 30b.

Though not shown, the first separator has the same structure as the second separator 82, and detailed description thereof is omitted.

In the second embodiment, the outlet connection grooves 84 are provided in parallel with the direction perpendicular to the wall surface 72b. Therefore, the pressure loss in the oxygen-containing gas flowing through the outlet connection grooves 84 is small.

In the structure, it is possible to prevent water produced in the power generation from flowing continuously from the outlet connection grooves 84 to the oxygen-containing gas discharge passage 30b. Thus, leakage of electricity to the ground through the water produced in the power generation is prevented further reliably. Moreover, the outlet connection grooves 84 extend substantially in the direction of gravity. Therefore, the performance of discharging the water is improved easily.

Figure 6:
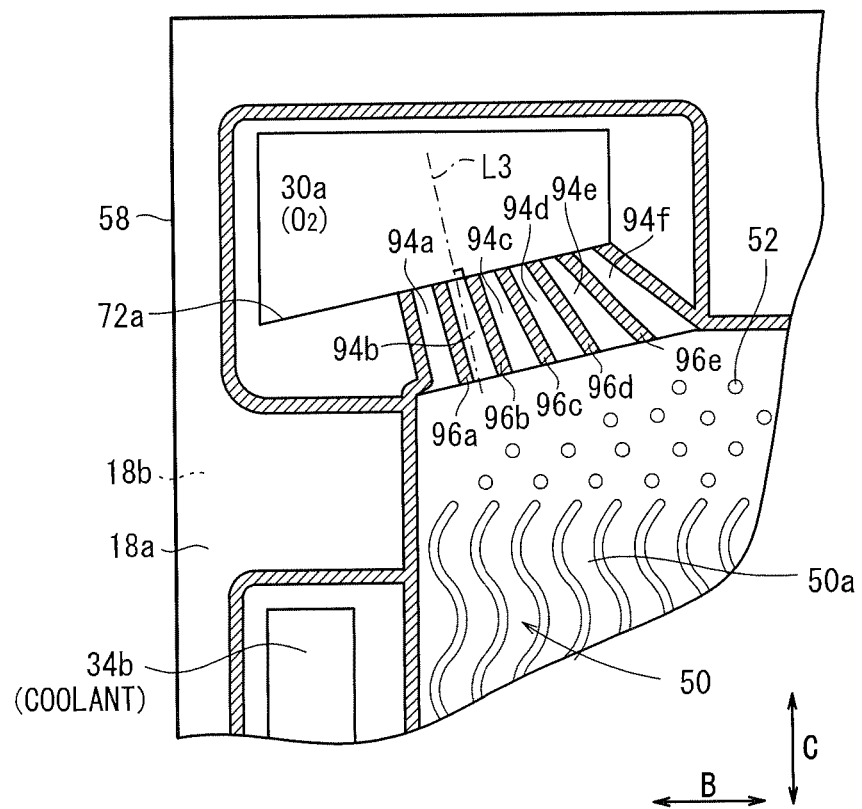
FIG. 6 is a front view showing a second separator of a fuel cell according to a third embodiment of the present invention.
Figure 7:
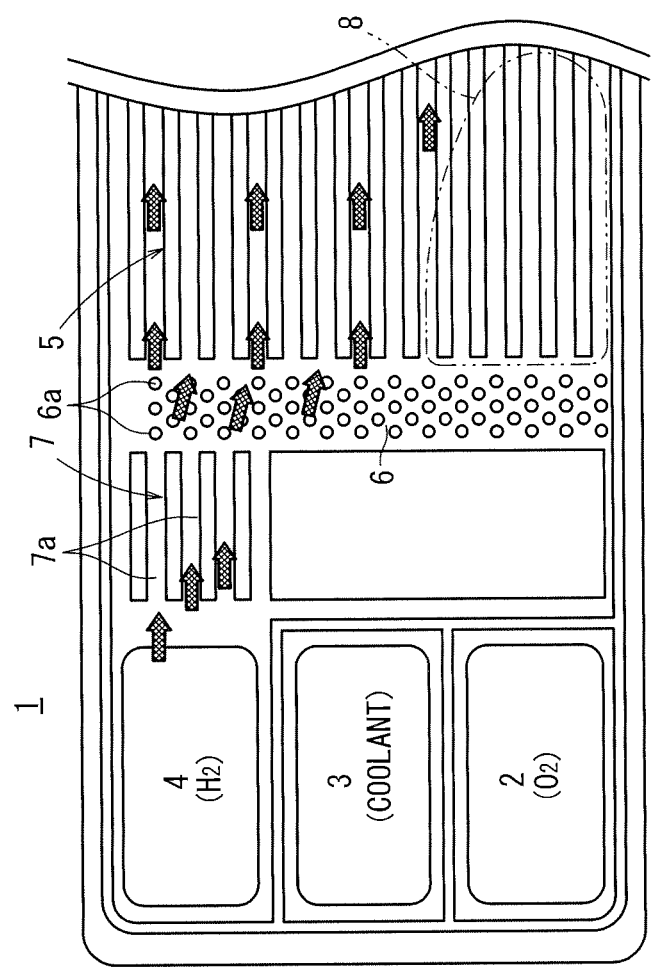
FIG. 7 is a view showing a separator structure of a fuel cell disclosed in Japanese Laid-Open Patent Publication No. 2008-021515.

FIG. 6 is a front view showing a second separator 92 of a fuel cell 90 according to a third embodiment of the present invention.

The second separator 92 has a plurality of receivers 96a to 96e at a portion connecting the oxygen-containing gas supply passage 30a and the inlet buffer 52. The receivers 96a to 96e form a plurality of the inlet connection grooves 94a to 94f. The inlet connection grooves 94a to 94f are inclined from a direction (perpendicular line L3) perpendicular to a wall surface 72a of the oxygen-containing gas supply passage 30a toward the center of the oxygen-containing gas flow field 50, at different angles or at stepwise-changing angles.

Specifically, the inlet connection groove 94f provided on the center side of the oxygen-containing gas flow field 50 is inclined at a large angle from the direction perpendicular to the wall surface 72a, in comparison with the inlet connection groove 94a provided on a lateral side of the oxygen-containing gas flow field 50.

As described above, in the third embodiment, the inlet connection groove 94f provided on the center side of the oxygen-containing gas flow field 50 is inclined at the large angle (at the maximum angle thereof). Therefore, the oxygen-containing gas is suitably supplied to the inlet buffer 52 adjacent to the fuel gas supply passage 32a as well. In the structure, the oxygen-containing gas is further uniformly and suitably supplied to the entire area of the oxygen-containing gas flow field 50.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell including a plurality of power generation cells each formed by stacking an electrolyte electrode assembly and a separator together in a stacking direction, the electrolyte electrode assembly including a pair of electrodes and an electrolyte interposed between the electrodes,
   a reactant gas flow field for supplying a fuel gas or an oxygen-containing gas as a reactant gas along one of the electrodes being formed on one surface of the separator facing the one electrode,
   a reactant gas supply passage extending through at least one corner of the power generation cell in the stacking direction, the reactant gas flowing through the reactant gas supply passage into the reactant gas flow field,
   wherein an inlet buffer is provided upstream of the reactant gas flow field,
   the reactant gas supply passage and the inlet buffer are connected by a plurality of inlet connection grooves provided on a region of the separator located between the reactant gas supply passage and a part of the inlet buffer in the width direction,
   the plurality of inlet connection grooves are parallel to each other, and
   in a surface of the separator, the inlet connection grooves are angled toward the center of the reactant gas flow field as compared to a line drawn perpendicular to a wall surface of the reactant gas supply passage that is adjacent to the inlet buffer.

2. A fuel cell according to claim 1, wherein a reactant gas discharge passage extends through another corner of the power generation cell that is diagonally opposite to the one corner of the power generation cell in the stacking direction, for allowing the reactant gas to flow out of the reactant gas flow field;
   an outlet buffer is provided downstream of the reactant gas flow field;
   the reactant gas discharge passage and the outlet buffer are connected by a plurality of outlet connection grooves; and
   in a surface of the separator, the outlet connection grooves are angled toward the center of the reactant gas flow field as compared to a line drawn perpendicular to wall surface of the reactant gas discharge passage that is adjacent to the outlet buffer.

3. A fuel cell according to claim 2, wherein the outlet connection grooves are angled at an angle which is different from an angle at which the inlet connection grooves are inclined.

4. A fuel cell according to claim 1, wherein the separator has a rectangular shape; and
  an oxygen-containing gas supply passage and a fuel gas supply passage each comprising the reactant gas supply passage extend respectively through both corners on one of short sides.

5. The fuel cell of claim 1, wherein in a surface of the separator on an oxygen-containing gas side, outlet connection grooves are provided in parallel with a direction perpendicular to a wall surface of an oxygen-containing gas discharge passage that is adjacent to an outlet buffer.

* * * * *